(12) United States Patent
Hu et al.

(10) Patent No.: US 12,219,572 B2
(45) Date of Patent: Feb. 4, 2025

(54) METHODS AND DEVICES FOR ENHANCED DAI

(71) Applicant: HUAWEI TECHNOLOGIES CO., LTD., Guangdong (CN)

(72) Inventors: Wenquan Hu, Shenzhen (CN); Bengt Lindoff, Kista (SE); Sha Hu, Lund (SE); Yongxia Lyu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 392 days.

(21) Appl. No.: 17/670,100

(22) Filed: Feb. 11, 2022

(65) Prior Publication Data

US 2022/0167388 A1    May 26, 2022

Related U.S. Application Data

(63) Continuation of application No. PCT/EP2019/071842, filed on Aug. 14, 2019.

(51) Int. Cl.
*H04W 72/12* (2023.01)
*H04L 1/1812* (2023.01)
*H04W 72/23* (2023.01)

(52) U.S. Cl.
CPC .......... *H04W 72/23* (2023.01); *H04L 1/1812* (2013.01)

(58) Field of Classification Search
None
See application file for complete search history.

(56) References Cited

U.S. PATENT DOCUMENTS

2022/0225390 A1* 7/2022 Harada ................. H04W 72/23

FOREIGN PATENT DOCUMENTS

WO    2019212628 A1    11/2019

OTHER PUBLICATIONS

ZTE: "Enhancements on Multi-TRP and Multi-panel Transmission", 3GPP Draft; R1-1906236 Enhancements On Multi-TRP and Multi-Panel Transmission, 3rd Generation Partnership Project (3GPP), May 13, 2019.*
PANASONIC: "On multi-TRP enhancements for NR MIMO in Rel. 16", 3GPP Draft; R1-1900677 PANASONIC_NR_MIMO_MULTI_TRP Enhancements, 3rd Generation Partnership Project (3GPP), Jan. 20, 2019.*
VIVO: "Discussion on multi PDCCH based multi TRP transmission", 3GPP Draft; R1-1900137 Discussion On MUL TI PDCCH Based Multi-TRP Transmission_Final, 3rd Generation Partnership Project (3GPP), Jan. 12, 2019.*

(Continued)

*Primary Examiner* — Kouroush Mohebbi
(74) *Attorney, Agent, or Firm* — Fish & Richardson P.C.

(57) ABSTRACT

A communication method includes: obtains a first DAI in a first downlink control channel associated with transmission of a first transport block, wherein the first DAI indicates a first scheduling assignment for the first transport block; obtains a second DAI in a second downlink control channel associated with transmission of a second transport block, wherein the second DAI indicates a second scheduling assignment for the second transport block; determines that at least one value of the second DAI is an assigned value identical to a value of the first DAI.

18 Claims, 5 Drawing Sheets

(56) References Cited

OTHER PUBLICATIONS

3GPP TS 38.213 V15.5.0 (Mar. 2019), "3rd Generation Partnership Project; Technical Specification Group Radio Access Network; NR; Physical layer procedures for control (Release 15)," Mar. 2019, 104 pages.
Huawei, HiSilicon, "Reliability/robustness enhancement with multi-TRP/panel," 3GPP TSG RAN WG1 meeting #97, R1-1906039, Reno, USA, May 13-17, 2019, 10 pages.
Huawei, "Summary of 7.2.6.1.1 Potential enhancements to PDCCH," 3GPP TSG RAN WG1 Ad-Hoc Meeting 1901, R1-1901433, Taipei, Jan. 21-25, 2019, 41 pages.
Panasonic, "On multi-TRP enhancements for NR MIMO in Rel. 16," 3GPP TSG RAN WG1 Ad-Hoc Meeting 1901, R1-1900677, Taipei, Taiwan, Jan. 21-25, 2019, 8 pages.
PCT International Search Report and Written Opinion issued in International Application No. PCT/EP2019071842 on Apr. 24, 2020, 15 pages.
Vivo et al., "Discussion on multi PDCCH based multi TRP transmission," 3GPP TSG RAN WG1 Ad-Hoc Meeting 1901, R1-1900137, Taipei, Taiwan, Jan. 21-25, 2019, 16 pages.
Zte et al., "Enhancements on Multi-TRP and Multi-panel Transmission," 3GPP TSG RAN WG1 #97, R1-1906236, Reno, USA, May 13-17, 2019, 14 pages.

\* cited by examiner

METHODS AND DEVICES FOR ENHANCED DAI

CROSS-REFERENCE TO RELATED APPLICATIONS

This application is a continuation of International Application No. PCT/EP2019/071842, filed on Aug. 14, 2019. The disclosure of the afore-mentioned application is hereby incorporated by reference in its entirety.

TECHNICAL FIELD

The embodiments of the invention relate to a client device and a serving device for enhanced downlink assignment index. Furthermore, the embodiments of the invention also relate to corresponding methods and a computer program.

BACKGROUND

In 3rd generation partnership project (3GPP), the basic support for ultra reliable and low latency communication (URLLC) was introduced with transmission time interval (TTI) structures for low latency as well as methods for improved reliability. Further use cases with tighter requirements have been identified as important for the new radio (NR) evolution, in addition to the need for enhancing the enabled use cases.

Key use cases were identified to be considered for enhancing enabled use case improvements, such as augmented reality/virtual reality (AR/VR) for the entertainment industry; new use cases with higher requirements, such as factory automation, transport Industry, including the remote driving use case, and electrical power distribution.

Enhanced URLLC (eURLLC) is introduced to meet even higher requirements compared to URLLC. Layer 1 (L1) enhancements are part of the key objectives in eURLLC and the L1 enhancements include physical downlink control channel (PDCCH) enhancements, uplink control information (UCI) enhancements, physical uplink shared channel (PUSCH) enhancements and enhancements to scheduling, hybrid automatic repeat request (HARD), and channel state information (CSI) processing timeline, uplink inter user equipment (UE) transmission prioritization and/or multiplexing and enhanced uplink configured grant (grant free) transmissions.

Furthermore, repetition and rescheduling of PDCCH and PDSCH to achieve reliability requirements will be possible. The repetition scheme can be applied in frequency domain, e.g. in same or different control recourse sets (CORESETs), in time domain, or in spatial domain, e.g. in a multi transmission and reception point (TRP) scenario.

Evaluations have been performed in 3GPP to evaluate performances of different repetition schemes. There can be multiple PDCCH repetition schemes, however a common character is that multiple PDCCHs are associated with a same transport block (TB) transmitted in the same or different redundant versions. One example of PDCCH repetitions from multiple TRPs can be when two PDCCHs from two different TRPs are transmitted to schedule one or two following-up PDSCH(s) to achieve high reliability on the PDCCH.

SUMMARY

An objective of embodiments of the invention is to provide a solution which mitigates or solves the drawbacks and problems of conventional solutions.

A further objective of the invention is to introduce an enhanced DAI mechanism for wireless communication systems compared to conventional solutions.

The above and further objectives are solved by the subject matter of the independent claims. Further advantageous embodiments of the invention can be found in the dependent claims.

According to a first aspect of the invention, the above mentioned and other objectives are achieved with a client device for a wireless communication system, the client device being configured to obtain a first downlink assignment index, DAI, in a first downlink control channel associated with transmission of a first transport block, wherein the first DAI indicates a first scheduling assignment for the first transport block; obtain a second DAI in a second downlink control channel associated with transmission of a second transport block, wherein the second DAI indicates a second scheduling assignment for the second transport block; determine that at least one value of the second DAI is an assigned value identical to a value of the first DAI.

The first and second DAI can be obtained in downlink control information (DCI) of the first and the second downlink control channels. The first and the second downlink control channels can e.g. be PDCCH in NR systems. The first and second DAI can each have one or more values. That the value of the second DAI is an assigned value identical to a value of the first DAI means that the one or more values of the second DAI are the same as the one or more values of the first DAI.

An advantage of the client device according to the first aspect is that downlink control channel reliability is increased and/or that the blocking rate of downlink control channel is reduced.

In an implementation form of a client device according to the first aspect, the first transport block and the second transport block are the same transport block upon determining that the at least one value of the second DAI is an assigned value identical to the value of the first DAI.

The same transport block can mean that the first and second transport block are the same transport block with the same or different redundancy versions.

An advantage with this implementation form is that flexible scheduling of the same transport block is enabled in the communication system.

In an implementation form of a client device according to the first aspect, the client device is further configured to receive the first transport block in a first downlink data channel based on the first DAI; receive the second transport block in a second downlink data channel based on said second DAI.

The first and second downlink data channels can e.g. be PDSCH in NR systems.

An advantage with this implementation form is that the reliability of the downlink data channel, such as PDSCH, can also be enhanced.

In an implementation form of a client device according to the first aspect, the client device is further configured to generate a single hybrid automatic repeat request, HARQ, feedback bit for the first transport block and the second transport block based on the reception of the first transport and the second transport block.

An advantage with this implementation form is less payload bits in HARQ feedback since only a single bit is used. Further a more robust HARQ feedback procedure is provided by this implementation form.

In an implementation form of a client device according to the first aspect, the client device is further configured to at least one of generate the single HARQ feedback bit based on combining a first HARQ feedback bit for the first transport block and a second HARQ feedback bit for the second transport block; and generate the single HARQ feedback bit based on joint decoding of the first transport block and the second transport block.

An advantage with this implementation form is that flexible implementation of the single HARQ feedback bit generation can be realized in the client device.

In an implementation form of a client device according to the first aspect, the client device is further configured to receive the first transport block and the second transport block in a single downlink data channel based on at least one of the first DAI and the second DAI.

It is noted that a single transport block is transmitted in the single downlink data channel. Hence, the first transport block and the second transport block are the same transport block in this implementation form.

An advantage with this implementation form is that flexible scheduling for the same transport block can be supported in the communication system.

In an implementation form of a client device according to the first aspect, wherein each of the first DAI and the second DAI indicates at least one of a counter DAI and a total DAI.

An advantage with this implementation form is that both multi carrier and single carrier scheduling can be supported.

In an implementation form of a client device according to the first aspect, the counter DAI is a first type counter DAI indicating accumulative number of {TRP, serving cell and downlink control channel monitoring occasion}-pairs up to the current TRP and the current serving cell and current PDCCH monitoring occasion; or a second type counter DAI indicating accumulative number of {serving cell and downlink control channel monitoring occasion}-pairs up to the current serving cell and current PDCCH monitoring occasion.

For the first type of counter DAI the ordering of the above pairs can be: firstly in ascending order of TRP related index, secondly in serving cell index, and thirdly in ascending order of downlink control channel (such as PDCCH) monitoring occasion index. For the second type of counter DAI the ordering of the pairs can be: firstly in ascending order of serving cell index, and secondly in ascending order of downlink control channel (such as PDCCH) monitoring occasion index on each TRP.

An advantage with this implementation form is that when multi TRP scheduling is enabled, the first type of counter DAI can be applied to support multi TRP scheduling. Otherwise the second type of counter DAI can be applied to provide backward compatibility with previous standards.

In an implementation form of a client device according to the first aspect, the client device is further configured to obtain type information indicating the type of counter DAI based on a higher layer signaling.

The higher layer signaling can e.g. be MAC CE or RRC signaling. The signaling can be received from the network e.g. through downlink control signaling of a network access node or a TRP.

An advantage with this implementation form is that a semi-static mechanism is provided which means less signalling overhead in the communication system.

According to a second aspect of the invention, the above mentioned and other objectives are achieved with a serving device for a wireless communication system, the serving device being configured to obtain a first DAI for a first downlink control channel associated with transmission of a transport block, wherein the first DAI indicates a first scheduling assignment for the transport block; obtain at least one second DAI indicating a second scheduling assignment for a second downlink control channel associated with transmission of the transport block, wherein the second DAI indicates a second scheduling assignment for the transport block and wherein at least one value of the second DAI is an assigned value identical to a value of the first DAI; transmit the first DAI in the first downlink control channel; and transmit the second DAI in the second downlink control channel.

The serving device can e.g. be a network access node such as a gNB in NR. However, the serving device can also be a network control node configured to control one or more TRPS.

Furthermore, the serving device can be configured to assign the one or more values of the second DAI to be identical to the one or more values of the first DAI, The first DAI can be transmitted in the first downlink control channel to a client device. The second DAI can be transmitted in the second downlink control channel to the client device.

An advantage of the serving device according to the second aspect is that downlink control channel reliability is increased and/or that the blocking rate of downlink control channel is reduced.

In an implementation form of a serving device according to the second aspect, the serving device is further configured to transmit the transport block in a first downlink data channel; and transmit the transport block in a second downlink data channel.

An advantage with this implementation form is that the reliability of the downlink data channel, such as PDSCH, can also be enhanced.

In an implementation form of a serving device according to the second aspect, the serving device is further configured to receive a single HARQ feedback bit for the transport block in response to the transmission of the transport block.

An advantage with this implementation form is less payload bits in HARQ feedback since only a single bit is used. Further a more robust HARQ feedback procedure is provided by this implementation form.

In an implementation form of a serving device according to the second aspect, the serving device is further configured to transmit the transport block in a single downlink data channel.

An advantage with this implementation form is that flexible scheduling for the same transport block can be supported in the communication system, In an implementation form of a serving device according to the second aspect, each of the first DAI and the second DAI indicates at least one of a counter DAI and a total DAI.

An advantage with this implementation form is that both multi carrier and single carrier scheduling can be supported.

In an implementation form of a serving device according to the second aspect, the counter DAI is a first type of counter DAI indicating accumulative number of {transmission and reception point, serving cell and downlink control channel monitoring occasion}-pairs; or a second type of counter DAI indicating accumulative number of {serving cell and downlink control channel monitoring occasion}-pairs, An advantage with this implementation form is that when multi TRP scheduling is enabled, the first type of counter DAI can be applied to support multi TRP scheduling. Otherwise the second type of counter DAI can be applied to provide backward compatibility with previous standards.

In an implementation form of a serving device according to the second aspect, the serving device is further configured to signal type information indicating the type of counter DAI in higher layer signaling.

An advantage with this implementation form is that a semi-static mechanism is provided which means less signalling overhead in the communication system.

According to a third aspect of the invention, the above mentioned and other objectives are achieved with a method for a client device, the method comprises obtaining a first downlink assignment index, DAI, in a first downlink control channel associated with transmission of a first transport block, wherein the first DAI indicates a first scheduling assignment for the first transport block; obtaining a second DAI in a second downlink control channel associated with transmission of a second transport block, wherein the second DAI indicates a second scheduling assignment for the second transport block; and determining that at least one value of the second DAI is an assigned value identical to a value of the first DAI.

The method according to the third aspect can be extended into implementation forms corresponding to the implementation forms of the client device according to the first aspect. Hence, an implementation form of the method comprises the feature(s) of the corresponding implementation form of the client device.

The advantages of the methods according to the third aspect are the same as those for the corresponding implementation forms of the client device according to the first aspect.

According to a fourth aspect of the invention, the above mentioned and other objectives are achieved with a method for a serving device, the method comprises obtaining a first DAI for a first downlink control channel associated with transmission of a transport block, wherein the first DAI indicates a first scheduling assignment for the transport block; obtaining at least one second DAI indicating a second scheduling assignment for a second downlink control channel associated with transmission of the transport block, wherein the second DAI indicates a second scheduling assignment for the transport block and wherein at least one value of the second DAI is an assigned value identical to a value of the first DAI; transmitting the first DAI in the first downlink control channel; and transmitting the second DAI in the second downlink control channel.

The method according to the fourth aspect can be extended into implementation forms corresponding to the implementation forms of the serving device according to the second aspect. Hence, an implementation form of the method comprises the feature(s) of the corresponding implementation form of the serving device.

The advantages of the methods according to the fourth aspect are the same as those for the corresponding implementation forms of the serving device according to the second aspect.

According to a fifth aspect of the invention, the above mentioned and other objectives are achieved with a non-transitory machine-readable storage medium having stored thereon processor-executable instructions, which when executed by a processor of a device, cause the device to implement a method according to embodiments of the invention.

The invention also relates to a computer program, characterized in program code, which when run by at least one processor causes said at least one processor to execute any method according to embodiments of the invention.

Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the invention will be apparent from the following detailed description.

BRIEF DESCRIPTION OF THE DRAWINGS

The appended drawings are intended to clarify and explain different embodiments of the invention, in which.

DETAILED DESCRIPTION

As previously mentioned in the background section, 3GPP will introduce eURLLC. To improve eURLLC for future applications the inventors have realized a need for enhanced DAI. Moreover, to further improve eURLLC the inventors also propose an enhanced HARQ feedback mechanism which can be combined with the present enhanced DAI.

Therefore, the inventors introduce a client device and a serving device providing such enhanced DAI and HARQ feedback mechanism. Also, corresponding methods and computer program are disclosed.

Figure 1:
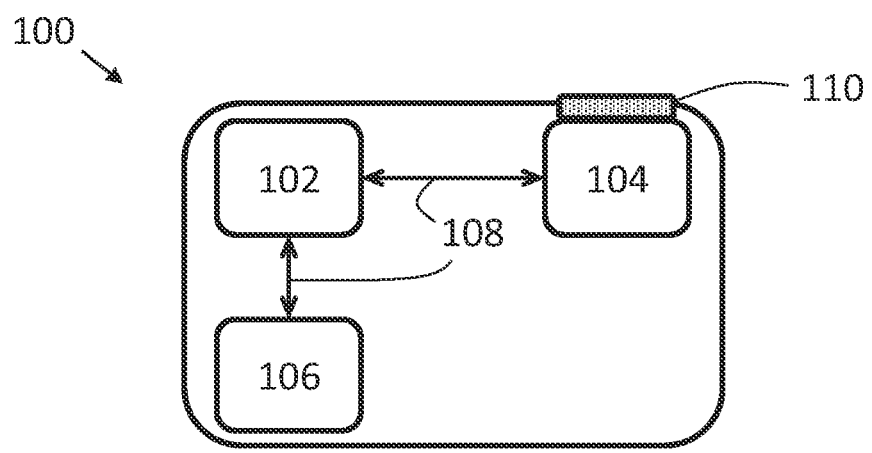
FIG. 1 shows a client device according to an embodiment of the invention.

FIG. 1 shows a client device 100 according to an embodiment of the invention. In the embodiment shown in FIG. 1, the client device 100 comprises a processor 102, a transceiver 104 and a memory 106. The processor 102 may be coupled to the transceiver 104 and the memory 106 by communication means 108 known in the art. The client device 100 may further comprise an antenna or antenna array 110 coupled to the transceiver 104, which means that the client device 100 may be configured for wireless communications in a wireless communication system. That the client device 100 may be configured to perform certain actions can in this disclosure be understood to mean that the client device 100 comprises suitable means, such as e.g. the processor 102 and the transceiver 104, configured to perform said actions.

The client device 100 in this disclosure includes but is not limited to: a UE such as smart phones, a cellular phone, a cordless phone, a Session Initiation Protocol (SIP) phone, a Wireless Local Loop (WLL) station, a Personal Digital Assistant (PDA), a handheld device having a wireless communication function, a computing device or another processing device connected to a wireless modem, an in-vehicle device, a wearable device, integrated access and backhaul node (IAB) such as mobile car or equipment installed in a car, drone, device-to-device (D2D) device, wireless cameras, mobile station, access terminal, user unit, wireless communication device, station of wireless local access network (WLAN), wireless enabled tablet computers, laptop-embedded equipment, USB dangles, wireless customer-premises equipment (CPE), and/or chipset. In an Internet of things (IOT) scenario, the client device 100 may represent a machine or other device or chipset which performs communication with other wireless device and/or a network equipment.

The UE may further be referred to as mobile telephone, cellular telephone, computer tablet or laptop with wireless capability. The UE in this context may be, for example, portable, pocket-storable, hand-held, computer-comprised, or vehicle-mounted mobile device, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as NR.

The processor 102 may be referred to as one or more general-purpose CPU, one or more digital signal processor (DSP), one or more application-specific integrated circuit (.ASIC), one or more field programmable gate array (FPGA), one or more programmable logic device, one or more discrete gate, one or more transistor logic device, one or more discrete hardware component, one or more chipset.

The memory 106 may be a read-only memory, a random access memory, or a non-volatile random access memory (NVRAM).

The transceiver 104 may be a transceiver circuit, a power controller, an antenna, or an interface which communicates with other modules or devices.

In embodiments, the transceiver 104 may be a separate chipset, or it is integrated with processor in one chipset. While in some implementations, the transceiver 104, the memory 106 and the processor 102 are integrated in one chipset.

According to embodiments of the invention the client device 100 is configured to obtain a first DAI in a first downlink control channel 522 associated with transmission of a first transport block. The first DAI indicates a first scheduling assignment for the first transport block. The client device 100 is further configured to obtain a second DAI in a second downlink control channel 524 associated with transmission of a second transport block. The second DAI indicates a second scheduling assignment for the second transport block. The client device 100 is further configured to determine that at least one value of the second DAI is an assigned value identical to a value of the first DAI.

The first downlink control channel 522 and the second downlink control channel 524 in this disclosure includes but is not limited to PDCCH. The first downlink control channel 522 and the second downlink control channel 524 may be in a same carrier or component carrier, or the first downlink control channel 522 and the second downlink control channel 524 are in different carriers or component carriers. In one possible implementation, the first downlink control channel 522 and the second downlink control channel 524 in the same carrier or component carrier may occupy different time-frequency resources.

Figure 2:
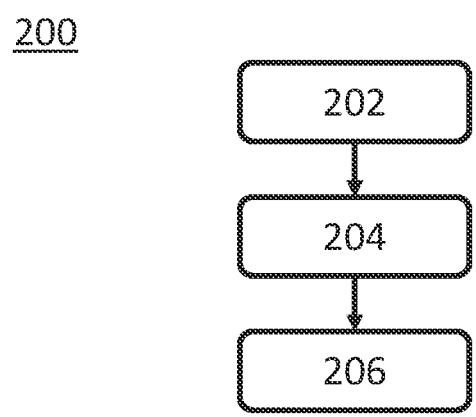
FIG. 2 shows a method for a client device according to an embodiment of the invention.

FIG. 2 shows a flow chart of a corresponding method 200 which may be executed in a client device 100, such as the one shown in FIG. 1. The method 200 comprises obtaining 202 a first DAI in a first downlink control channel 522 associated with transmission of a first transport block, wherein the first DAI indicates a first scheduling assignment for the first transport block. The method 200 further comprises obtaining 204 a second DAI in a second downlink control channel 524 associated with transmission of a second transport block. The second DAI indicates a second scheduling assignment for the second transport block. The method 200 further comprises determining 206 that at least one value of the second DAI is an assigned value identical to a value of the first DAI.

Figure 3:
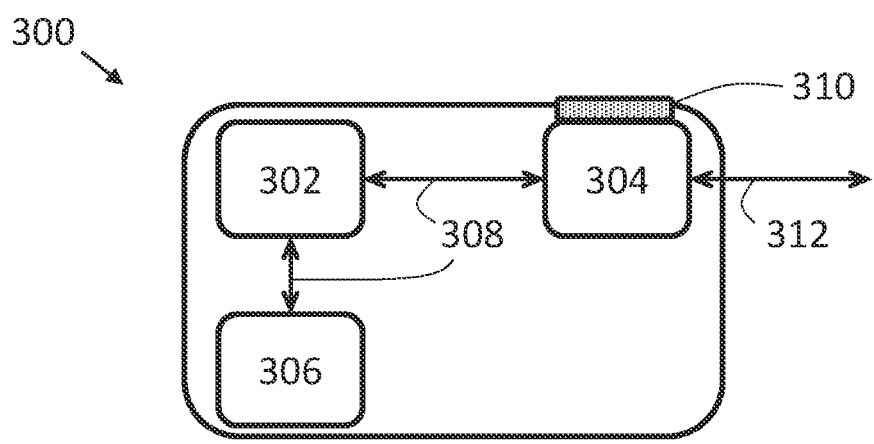
FIG. 3 shows a serving device according to an embodiment of the invention.

FIG. 3 shows a serving device 300 according to an embodiment of the invention. In the embodiment shown in FIG. 3, the serving device 300 comprises a processor 302, a transceiver 304 and a memory 306. The processor 302 is coupled to the transceiver 304 and the memory 306 by communication means 308 known in the art. The serving device 300 may be configured for both wireless and wired communications in wireless and wired communication systems, respectively.

The wireless communication capability is provided with an antenna or antenna array 310 coupled to the transceiver 304, while the wired communication capability is provided with a wired communication interface 312 coupled to the transceiver 304. That the serving device 300 is configured to perform certain actions can in this disclosure be understood to mean that the serving device 300 comprises suitable means, such as e.g. the processor 302 and the transceiver 304, configured to perform said actions.

The serving device 300 in this disclosure includes but is not limited to: NodeB in Wideband Code Division Multiple Access (WCDMA) system, an Evolutional Node B (eNB) or evolved NodeB (eNodeB) in LTE system, or a relay node or an access point, or an in-vehicle device, a wearable device, or a gNB in 5G network.

Further, the serving device 300 herein may be denoted as a radio network access node, an access network access node, an access point, or a base station, e.g. a Radio Base Station (RBS), which in some networks may be referred to as transmitter, "gNB", "gNodeB", "eNB", "eNodeB", "NodeB" or "B node", depending on the technology and terminology used. The radio network access nodes may be of different classes such as e.g. macro eNodeB, home eNodeB or Pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems.

The serving device 300 herein may also be denoted as a transmitter (TX) UE or a source node in sidelink communications which means that the client device can act as a receiving (RX) UE. In such cases the first and second DAI can be comprised in sidelink control information (SCI) and the HARQ feedback can be transmitted in sidelink feedback channel (SLFCH).

The wireless communication systems in this disclosure includes but is not limited to: WCDMA system, LTE, 5G or future wireless communication system.

The processor 302 may be referred to as one or more general-purpose CPU, one or more digital signal processor (DSP), one or more application-specific integrated circuit (ASIC), one or more field programmable gate array (FPGA), one or more programmable logic device, one or more discrete gate, one or more transistor logic device, one or more discrete hardware component, one or more chipset.

The memory 306 may be a read-only memory, a random access memory, or a non-volatile random access memory (NVRAM).

The transceiver 304 may be a transceiver circuit, a power controller, an antenna, or an interface which communicates with other modules or devices.

In some embodiments, the transceiver 304 may be a separate chipset, or it is integrated with processor in one chipset. While in some implementations, the transceiver 304, the memory 306 and the processor 302 are integrated in one chipset.

According to embodiments of the invention the serving device 300 is configured to obtain a first DAI for a first downlink control channel 522 associated with transmission of a transport block. The first DAI indicates a first scheduling assignment for the transport block. The serving device 300 is further configured to obtain at least one second DAI indicating a second scheduling assignment for a second downlink control channel 522 associated with transmission of the transport block. The second DAI indicates a second scheduling assignment for the transport block and wherein at least one value of the second DAI is an assigned value identical to a value of the first DAI The serving device 300 is further configured to transmit the first DAI in the first downlink control channel 522. The serving device 300 is further configured to transmit the second DAI in the second downlink control channel 524.

Figure 4:
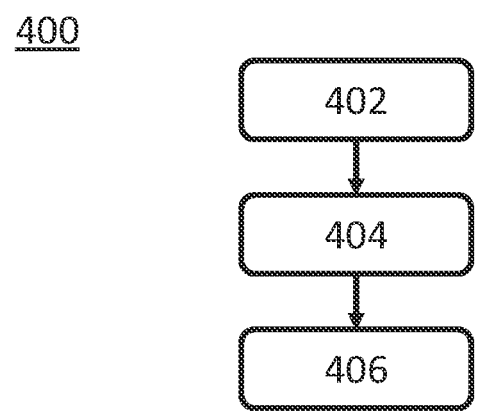
FIG. 4 shows a method for a serving device according to an embodiment of the invention.
Figure 5:
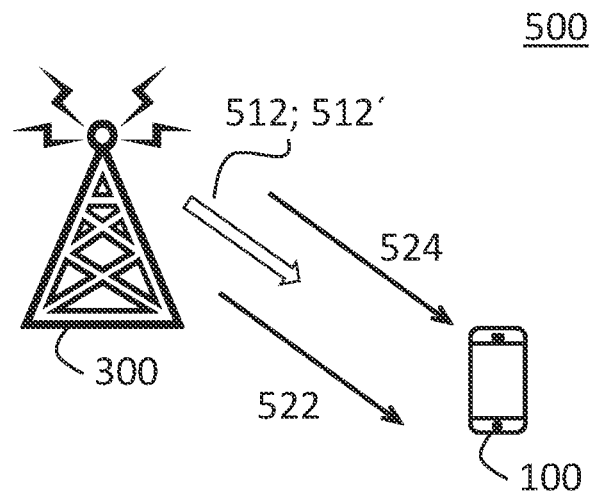
FIG. 5 shows a wireless communication system according to an embodiment of the invention.

FIG. 4 shows a flow chart of a corresponding method 400 which may be executed in a serving device 300, such as the one shown in FIG. 3. The method 400 comprises obtaining 402 a first DAI for a first downlink control channel 522 associated with transmission of a transport block, wherein the first DAI indicates a first scheduling assignment for the transport block. The method 400 further comprises obtaining 404 at least one second DAI indicating a second scheduling assignment for a second downlink control channel 522 associated with transmission of the transport block, wherein the second DAI indicates a second scheduling assignment for the transport block and wherein at least one value of the second DAI is an assigned value identical to a value of the first DAI The method 400 further comprises transmitting 406 the first DAI in the first downlink control channel 522. The method 400 further comprises transmitting 408 the second DAI in the second downlink control channel 524, FIG. 5 shows a wireless communication system 500 according to an embodiment of the invention. The wireless communication system 500 in FIG. 5 comprises a client device 100 and a serving device 300 configured to operate in the wireless communication system 500. For simplicity, the wireless communication system 500 shown in FIG. 5 only comprises one client device 100 and one serving device 300. However, the wireless communication system 500 may comprise any number of client devices 100 and any number of serving device 300 without deviating from the scope of the invention.

In the wireless communication system 500, the serving device 300 is represented as a network access node, such as a gNB. The serving device 300 is configured to transmit a first DAI in a first downlink control channel 522 to the client device 100 and further configured to transmit a second DAI in a second downlink control channel 524 to the client device 100.

In NR the downlink control channel corresponds to PDCCH which implies that the first and second DAIS are comprised in its respective DCI of PDCCH. Moreover, in embodiments the serving device 300 is configured to transmit a first transport block in a first downlink data channel 512 and a second transport block in a second downlink data channel 512'. In other embodiments the serving device 300 is configured to transmit the first and second transport block in a single downlink data channel 512: 512'. Therefore, in this embodiment the first and second transport block are the same transport block carried on the downlink data channel, hence only the downlink control channel is enhanced for higher reliability which can benefit with at least less specification complexity, In NR the downlink data channel corresponds to PDSCH. But it should be understood that the methods and devices according to embodiments of the invention may be implemented in any future or other wireless communication system, such as WLAN system. The methods and devices are not limited to NR and its terminology, hence different terminology may be used in other systems. Therefore, the terminology used in this disclosure are just for easiness of description.

Figure 6:
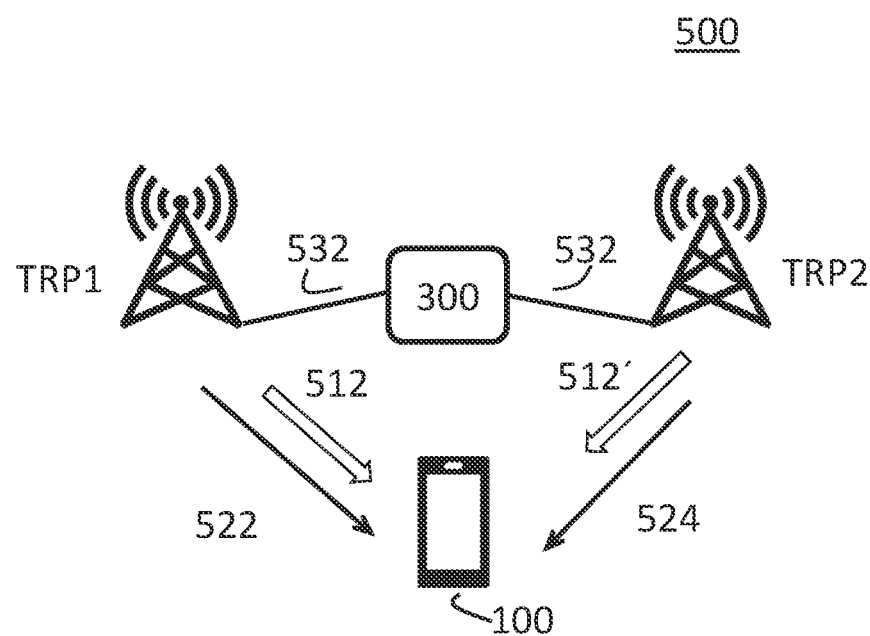
FIG. 6 shows a wireless communication system comprising TRPs according to an embodiment of the invention.

FIG. 6 shows a wireless communication system 500 according to an embodiment of the invention. The wireless communication system 500 in FIG. 6 comprises a serving device 300 acting as a network control node of a RAN. The serving device 300 is connected to a first TRP (TRP1) and a second TRP (TRP2), respectively, e.g. via a backhaul link 532. The first and second TRPs are configured to be controlled by the serving device 300.

In FIG. 6 the first TRP transmits a first DAI in a first downlink control channel to a client device 100 and the second TRP transmits a second DAI in a second downlink control channel to the client device 100. The first TRP further transmits a first transport block in a first downlink data channel 512 to the client device 100 and the second TRP further transmits a second transport block in a second downlink data channel 512'. Therefore, in this embodiment besides the enhancement to the downlink control channel, the downlink data channel is also enhanced for higher reliability by transmitting the transport block twice.

Furthermore, in embodiments of the invention a HARQ feedback mechanism is combined with the enhanced DAI as previously stated. Generally, dynamic HARQ codebooks where the number of acknowledgment (ACK) and negative acknowledgement (HACK) bits are dynamically generated have the advantage of reduced size of acknowledgement messages compared with semi-static codebooks where the number of ACK/HACK bits are semi-statically configured by the network. For the dynamic HARQ codebook, in order to align the understanding of HARQ codebooks between next generation base station such as gNB and UE, the present enhanced DAI mechanism is utilized for the generation of dynamic HARQ codebook.

In present 3GPP, DAI is included in downlink control information (DCI) which hence comprises the downlink assignment. The DAI field is further split into two parts, i.e. a counter DAI (cDAI) part and in the case of carrier aggregation a total DAI (tDAI) part.

The cDAI denotes the accumulative number of scheduled downlink transmissions or accumulative number of {serving cell, PDCCH monitoring occasion}-pair(s) up to the current serving cell and current PDCCH monitoring occasion, first in ascending order of serving cell index and then in ascending order of PDCCH monitoring occasion index.

The tDAI on the other hand indicates the total number of scheduled downlink transmissions up to the current PDCCH monitoring occasion and is updated from PDCCH monitoring occasion to PDCCH monitoring occasion.

A PDCCH monitoring occasion is an orthogonal frequency division multiplexing (OFDM) symbol when a UE starts blind decoding possible scheduling assignments and grants in a DCI. The UE may determine a PDCCH monitoring occasion in many different ways. In one non-limiting example the UE may determine the PDCCH monitoring occasion according to NR which implies that the UE determines a POOCH monitoring occasion from a PDCCH monitoring periodicity, a PDCCH monitoring offset, and a PDCCH monitoring pattern within a slot.

The cDAIs and tDAIs are in NR represented with decimal numbers in parenthesis, i.e. in the form "(cDAI, tDAI)". In practice two bits are used for each of the cDAIs and tDAIs and the numbering will wrap around according to the mapping given in Table 1. There are formulas for generating ACK/NACK bits.

TABLE 1

Value of counter DAI in DCI format 1_0 and of counter DAI or total DAI DCI format 1_1

| DAI MSB (most significant bit), LSB (least significant bit) | $V^{DL}_{C\text{-}DAI}$ or $V^{DL}_{T\text{-}DAI}$ | Number of {serving cell, PDCCH monitoring occasion}-pair(s) in which PDSCH transmission(s) associated with PDCCH or PDCCH indicating SPS PDSCH release is present, denoted as Y and Y ≥ 1 |
|---|---|---|
| 0,0 | 1 | (Y-1)mod 4 + 1 = 1 |
| 0,1 | 2 | (Y-1)mod 4 + 1 = 2 |
| 1,0 | 3 | (Y-1)mod 4 + 1 = 3 |
| 1,1 | 4 | (Y-1)mod 4 + 1 = 4 |

Furthermore, if one transmission on one component carrier is lost or is failed to decode, as long as the UE receives at least one transmission on one component carrier, the UE knows the value of the tDAI and hence the size of the HARQ codebook at this point in time. Moreover, by checking the values received of the cDAI, the UE can conclude which component carrier was missed and that a NACK should be assumed in the HARQ codebook for this position.

Therefore, to provide even deeper understanding of the enhanced DAI mechanism combined with a HARQ feedback procedure two different exemplary scenarios are presented in the following disclosure. Mentioned scenarios are set in a NR context hence the terminology and system design used but embodiments of the invention are not limited thereto.

The first scenario relates to the single carrier case while the second scenario relates to the multi-carrier case. Generally, in embodiments a single HARQ bit is generated for the first transport block and the second transport block based on the reception of the first transport block and the second transport block.

Two distinctive HARQ bit generation cases are disclosed, i.e. combining and joint decoding. In the combining case the single HARQ bit is generated based on combining a first HARQ feedback bit for the first transport block and a second HARQ feedback bit for the second transport block. In the joint decoding case on the other hand the single HARQ bit is generated based on joint decoding of the first transport block and the second transport block when multiple transport blocks have been received.

Single Carrier Case

Figure 7:
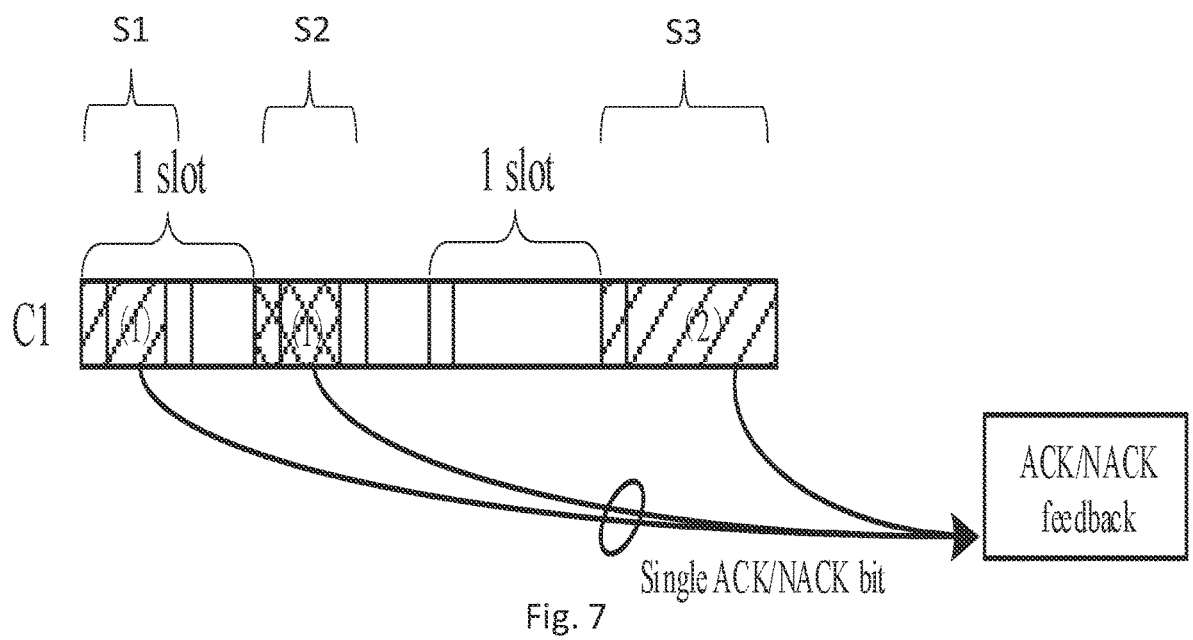
FIG. 7 illustrates a single carrier scenario.

FIG. 7 illustrates a single carrier scenario. A single carrier denoted C1 is divided into different slots from a frame structure perspective. Carrier C1 is used for PDSCH scheduling (and single serving cell) in which slot-based and mini-slot based scheduling is enabled for different service types, e.g., mini-slot based scheduling for URLLC services and slot-based scheduling for eMBB services. Since a single carrier is involved, only the cDAI value is needed for HARQ codebook generation. Hence, in this case it is assumed that the first DAI and the second DAI each comprises a cDAI value.

The slot-based and mini-slot based scheduling are introduced in the current 3GPP specification and will not be described further herein. The PDCCH occasion is assumed for each transmission opportunity of PDSCH transmission in FIG. 7.

In embodiments the cDAI is a type of cDAI indicating accumulative number of {serving cell and downlink control channel monitoring occasion}-pairs up to the current serving cell and current PDCCH monitoring occasion. The ordering of the pairs are in embodiments: first in the ascending order of serving cell index, and second in the ascending order of downlink control channel (such as PDCCH) monitoring occasion index on each TRP, where each TRP performs individual scheduling.

As shown in FIG. 7 the first S1 and second scheduling S2 are associated with the same transport block and hence the cDAI value 1, i.e. "(1)" in FIG. 7 for the first S1 and second scheduling S2, is indicated to the client device 100 in both DCIs. If a combined HARQ feedback of slot based and mini-slot based scheduling is applied as shown in FIG. 7, 2 bits will be generated, in which the first S1 and second scheduling S2 correspond to a single ACK/NACK information bit and the ACK/NACK information bits of slot based and mini-slot based scheduling are carried in a single HARQ codebook.

Alternatively, multiple HARQ codebooks can be generated in a single slot or a mini-slot by grouping different PDSCHs with different service requirements, e.g. one HARQ codebook is generated carrying the ACK/NACK information bits of slot based scheduling and another different HARQ codebook is generated carrying the ACK/NACK information bits of mini-slot based scheduling.

Furthermore, a codebook generation rule for the repeated and/or rescheduled PDSCHs could be stated: as long as one PDSCH of the repeated and/or rescheduled PDSCHs is correctly decoded, one ACK is generated in corresponding position in the codebook, otherwise one NACK is generated.

In a possible implementation, ACK can also be generated only if all copies are correctly decoded, otherwise a NACK is generated.

Alternatively, a joint decoding for the same transport block can be performed to generate a single ACK/NACK information bit for the same transport block.

For the second transport block indicated with cDAI value 2, i.e. "(2)" in FIG. 7, for a third scheduling S3, ACK/NACK is generated according to the decoding result of the corresponding PDSCH.

In a possible implementation, generating one ACK as long as one PDSCH of the repeated and/or rescheduled PDSCHs is correctly decoded, or generating one ACK only if all copies are correctly decoded may be configured by the serving device explicitly or may be specified by the standard. If it is configured by the serving device explicitly, the configuration signaling may be radio resource control (RRC) signaling or medium access control (MAC) control element (CE), however embodiments of the invention are not limited thereto.

Especially, in embodiments the client device 100 receives the configuration signaling from the serving device 300. If the configuration signaling indicates generating one ACK as long as one PDSCH of the repeated and/or rescheduled PDSCHs is correctly decoded, the client device 100 will generate an ACK if one PDSCH is correctly decoded for a repeated and/or rescheduled PDSCH. If the configuration signaling indicates generating one ACK only if all copies are correctly decoded, the client device 100 will generate an ACK if all the repeated PDSCH are decoded correctly.

The embodiment above supports that one ACK or NACK is generated for a duplicated transmission, and the overhead of the HARQ codebook can be reduced.

Figure 8:
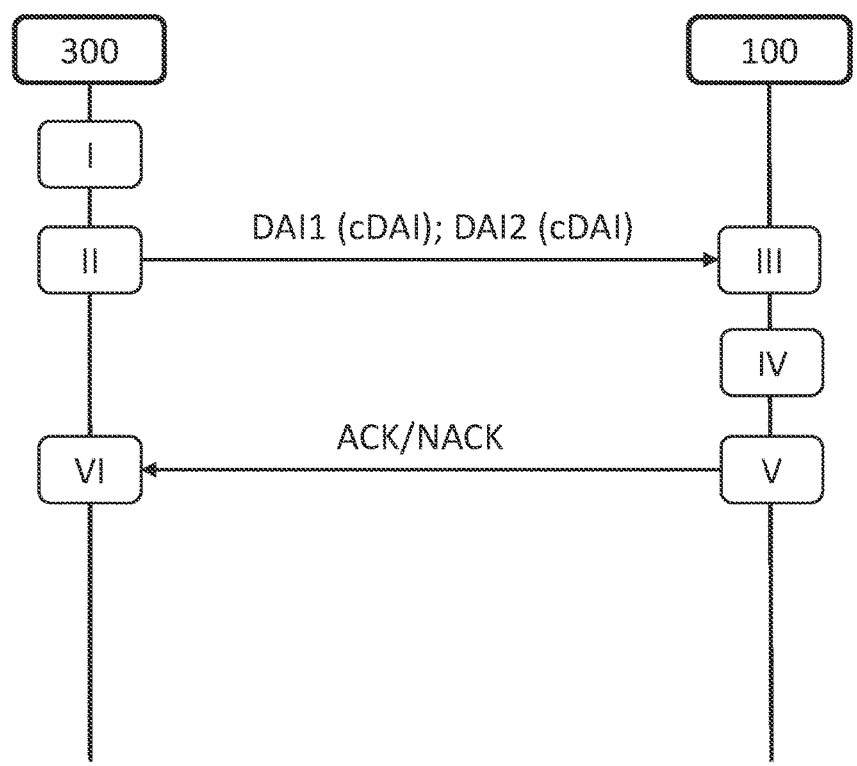
FIG. 8 shows interaction between a client device and a serving device in the single carrier scenario.

FIG. 8 illustrates the single carrier case further by showing interaction between a client device 100 and a serving device 300.

In step I, the serving device 300 obtains the cDAI value of the first DAI and thereafter assigns cDAI value of the second DAI to be identical to the cDAI value of the first AI.

In step II, the serving device 300 transmits the first DAI and the second DAI in separate PDCCHs to the client device 100.

In step III, the client device 100 receives the first DAI and the second DAI in separate PDCCHs.

In embodiments, the client device 100 obtains type information indicating the type of cDAl based on a higher layer signaling from the network. For example, a serving device 300 acting as a gNB can signal type information in MAC CE or RRC signaling to the client device 100. Upon the client device 100 has obtained the type information the client device 100 knows how to interpret the cDAI information.

In a non-limiting example, the type of cDAI can be a first type or a second type of cDAI. The first type of cDAI indicates accumulative number of {TRP, serving cell and downlink control channel monitoring occasion}-pairs up to the current TRP and the current serving cell and current PDCCH monitoring occasion; and the second type of cDAI indicates accumulative number of {serving cell and downlink control channel monitoring occasion}-pairs up to the current serving cell and current PDCCH monitoring occasion.

The client device 100 further in step Ill determines that the cDAI value of the second DAI is assigned a value identical to the cDAI value of the first DAI. This means that the client device 100 concludes that the separate PDCCHs corresponds to the same transport block.

In step IV, the client device 100 generates a single ACK/NACK bit for the same transport block by combining the ACK/NACK bits for multiple transport blocks according to a predefined combining rule or joint decoding multiple transport blocks when multiple transport blocks have been received, otherwise the client device 100 generates a single ACK/NACK bit based on the decoding result of the received transport block.

In step V, the client device 100 transmits the HARQ feedback, i.e. the single ACKINACK bit or separate ACK/NACK for the same transport block depending on the configuration signaling of the serving device as described above, to the serving device 300.

In step VI, the serving device 300 receives the single ACK/NACK bit in HARQ feedback signaling or separate ACKINACK bit for the same transport block based on configuration from the client device 100. Depending the content of the ARQ feedback signaling the serving device 300 may retransmit or not retransmit the transport block. The configuration is used to configure the client device 100 with ACKINACK combining rules for multiple transport blocks as described above.

Multi Carrier Case

Figure 9:
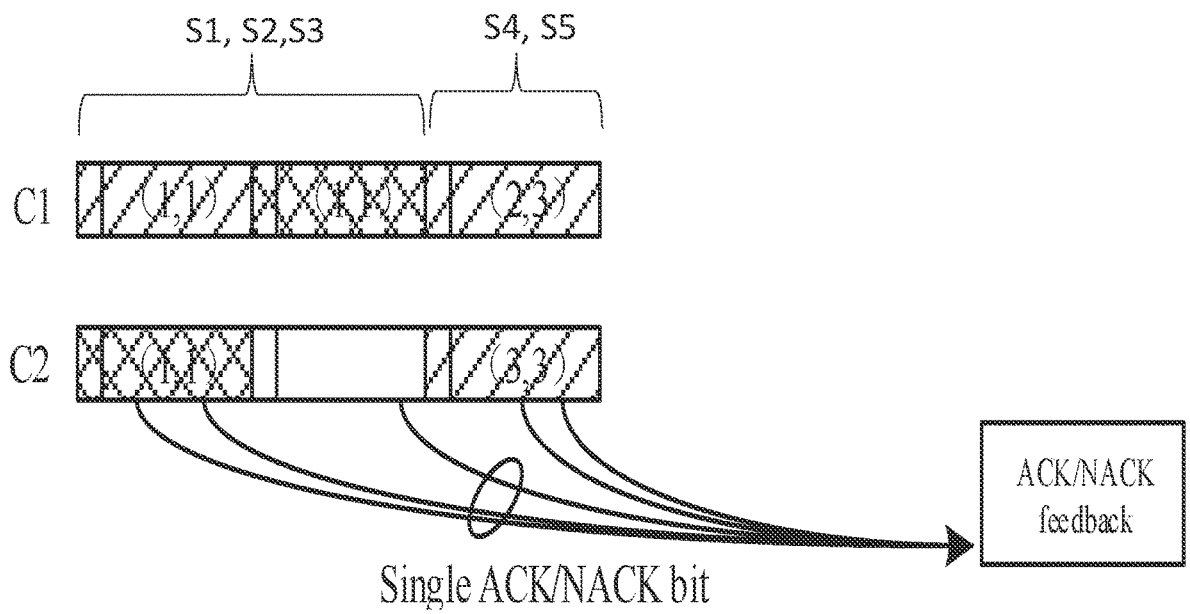
FIG. 9 illustrates a multi carrier scenario.

FIG. 9 illustrates a multi-carrier scenario. Carrier C1 and C2 are used for PDSCH scheduling in which slot-based and/or mini-slot based scheduling is enabled for different service types, e.g., mini-slot based scheduling for URLLC services and slot-based scheduling for eMBB services.

It should be understood that the carrier C1 and C2 may also be bandwidth part (BWP) of one carrier and one UE can be scheduled on two different BWPs. Although the current BWP defined in NR support one BWP for a UE, embodiments of the invention are not limited to one BWP.

In FIG. 9 since multiple carriers are enabled for PDSCH transmission in more than one serving cell both tDAI and cDAI are needed for HARQ codebook generation. Hence, it is assumed that the first DAI and the second DAI each comprises a cDAI value and a tDAI value.

As stated previously, in embodiments the cDAI is a type of cDAI indicating accumulative number of {serving cell and downlink control channel monitoring occasion}-pairs up to the current serving cell and current PDCCH monitoring occasion. The ordering of the pairs can be: first in the ascending order of serving cell index, and second in the ascending order of downlink control channel (such as PDCCH) monitoring occasion index on each TRP, where each TRP performs individual scheduling.

In embodiments the tDAI indicates the total number of {serving cell, PDCCH monitoring occasion}-pair(s) or {TRP, serving cell, PDCCH monitoring occasion}-pair(s) up to the current downlink control channel (such as PDCCH) monitoring occasion and is updated from downlink control channel monitoring occasion to downlink control channel monitoring occasion. As mentioned previously, a PDCCH monitoring occasion is an OFDM symbol when a UE starts blind decoding possible scheduling assignments and grants in a DCI. A UE determines a PDCCH monitoring occasion from a PDCCH monitoring periodicity, a PDCCH monitoring offset, and a PDCCH monitoring pattern within a slot.

As shown in FIG. 9 the first three PDCCH schedulings S1, S2, S3 on carrier C1 and C2 in FIG. 9 are associated with the same (single) transport block, hence cDAI value 1 and tDAI value of 1 are indicated to the client device 100, i.e. "(1,1,)" in FIG. 9, in the Das following the DAI values in the first monitoring occasion on the lowest serving cell. The further two schedulings S4, S5 on carrier C1 and C2 in FIG. 9, i.e. DAI values "(2,3)" for S4 and "(3,3)" for S5 in FIG. 9, are associated with two different transport blocks, Correspondingly, the ACK/NACK feedback in uplink transmission contains a 3-bit HARQ codebook. For the repeated transport blocks in the first three PDSCHs, a single ACK/HACK information bit is generated by the client device 100.

A codebook generation rule could e.g. be stated: as long as one PDSCH of the repeated and/or rescheduled PDSCHs is correctly decoded, an ACK is generated in corresponding position in the codebook, otherwise a NACK is generated; ACK can also be generated only if all copies are correctly decoded, otherwise a NACK is generated. Alternatively, a joint decoding for the same transport block can be performed to generate a single ACK/NACK information bit for the transport block.

It should be understood that generating one ACK as long as one PDSCH of the repeated and/or rescheduled PDSCHs is correctly decoded, or generating one ACK only if all copies are correctly decoded may be configurable by the serving device explicitly or may be specified by the standard as described above.

Figure 10:
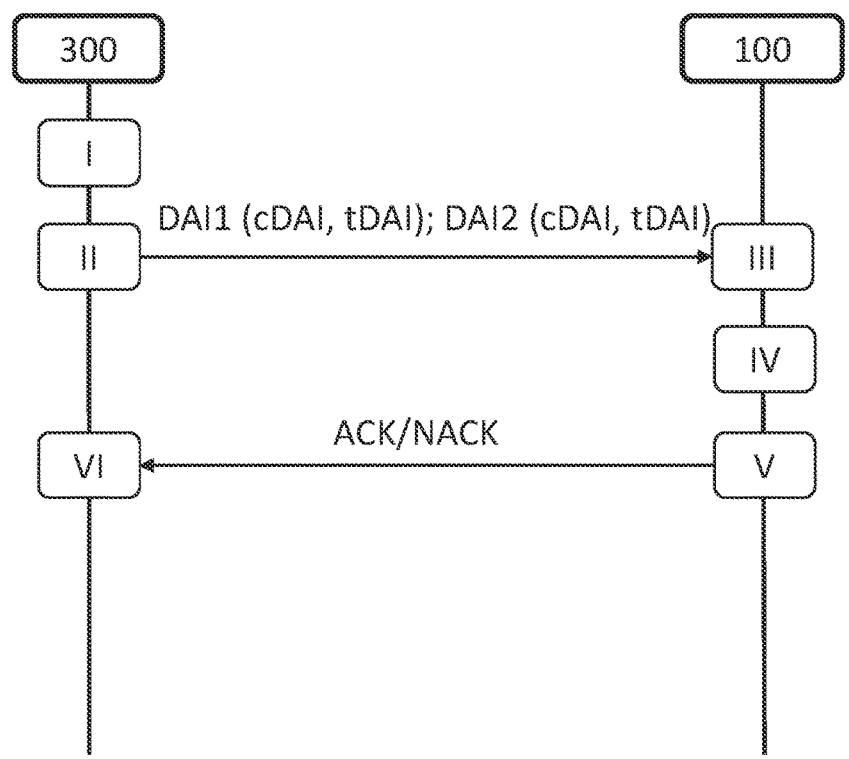
FIG. 10 shows interaction between a client device and a serving device in the multi carrier scenario.

FIG. 10 illustrates the multi carrier case further by showing interaction between a client device 100 and a serving device 300.

In step I, the serving device 300 obtains the cDAI and tDAI values of the first DAI and thereafter assigns cDAI and tDAI values of the second DAI to be identical to the cDAI and tDAI values of the first DAI.

In step II, the serving device 300 transmits the first DAI and the second DAI in separate PDCCHs to the client device 100.

In step III, the client device 100 receives the first DAI and the second DAI in separate PDCCHs based on the first DAI and the second DAI, respectively. Since the DAI is an information field in DCI the DAI information is used for reception.

The client device 100 further in step III determines that the cDAI and tDAI values of the second DAI are assigned values identical to the cDAI and tDAI values of the first DAI. This means that the client device 100 concludes that the separate PDCCHs corresponds to the same transport block.

In step IV, the client device 100 generates a single ACK/NACK bit for the same transport block by combining the ACK/NACK bits for multiple transport blocks or joint decoding multiple transport blocks when multiple transport blocks have been received, otherwise the client device 100 generates a single ACK/NACK bit based on the decoding result of the received transport block.

In step V, the client device 100 transmits the HARQ feedback, including the single ACK/NACK bit, to the serving device 300.

In step VI, the serving device 300 receives the single ACK/NACK bit for the transport block in HARQ feedback signaling from the client device 100. Depending the content of the HARQ feedback signaling the serving device 300 may retransmit or not retransmit the transport block.

Furthermore, in the mufti TRP scenarios, the enhanced DAI mechanism can be applied jointly or separately among TRPs depending on the backhaul assumption, i.e. if the backhaul is ideal or non-ideal. In the ideal backhaul case, the network can configure a single DAI mechanism among multiple TRPs, where ACK/NACKs corresponding to transport blocks scheduled by all the TRPs will be generated in a single HARQ code book and the DAI values "(cDAI, tDAI)" are counted in {TRP, serving cell, PDCCH monitoring occasion}-pairs.

In an embodiment, the cDAI is a type indicates accumulative number of {TRP, serving cell and downlink control channel monitoring occasion}-pairs up to the current TRP and the current serving cell and current PDCCH monitoring occasion. The ordering of the above pairs is in embodiments: firstly in ascending order of TRP related index, secondly in serving cell index, and thirdly in ascending order of downlink control channel (such as PDCCH) monitoring occasion index.

The tDAI included in the DCI indicates the total number of scheduled downlink transmissions up to the current PDCCH monitoring occasion and is updated from PDCCH monitoring occasion to PDCCH monitoring occasion.

One DAI mechanism (a joint HARQ feedback) among TRPs can be configured by a high layer signaling, e.g., RRC signaling or MAC CE for indicating to the client device 100 that joint HARQ feedback among TRPs is enabled.

In the non-ideal backhaul case, the network can configure one DAI mechanism for each TRP. Therefore, the DAI mechanism is operated independently on each TRP, and the independent DAI mechanism (a separate HARQ feedback) among TRPs can also be configured by a high layer signaling, e.g., RRC signaling or MAC CE for indicating to the client device 100 that HARQ feedback codebook is generated separately for each TRP.

In NR the set of PDCCH monitoring occasions for DCI format 1_0 or DCI format 1_1 for scheduling PDSCH receptions or SPS PDSCH release is defined as the union of PDCCH monitoring occasions across active downlink BWPs of configured serving cells, ordered in ascending order of start time of the search space set associated with a PDCCH monitoring occasion.

The cardinality of the set of PDCCH monitoring occasions defines a total number of M PDCCH monitoring occasions. When multiple PDCCHs schedule the same transport block, the number of PDCCH schedulings in different PDCCH monitoring occasions other than PDCCH schedulings in the first PDCCH monitoring occasion are not counted in the cardinality of the set of PDCCH monitoring occasions.

The value of the cDAI field in DCI format 1_0 or DCI format 1_1 denotes the accumulative number of {serving cell, PDCCH monitoring occasion}-pair(s) in which PDSCH reception(s) or SPS PDSCH release associated with DCI format 1_0 or DCI format 1_1 is present, up to the current serving cell and current PDCCH monitoring occasion, first in ascending order of serving cell index and then in ascending order of PDCCH monitoring occasion index in m, where $0 =< m < M$. When multiple PDCCHs schedule the same transport block, the PDCCHs other than the first PDCCH are not counted in the ascending order, and the values of the cDAI in PDCCHs are the same which follow the value of the cDAI in the first PDCCH.

The value of the tDAI, when present, in DCI format 1_1 denotes the total number of {serving cell, PDCCH monitoring occasion}-pair(s) in which PDSCH reception(s) or SPS PDSCH release associated with DCI format 1_0 or DCI format 1_1 is present, up to the current PDCCH monitoring occasion in and is updated from PDCCH monitoring occasion to PDCCH monitoring occasion. When multiple PDCCHs schedule a same transport block, PDCCHs other than the first PDCCH are not counted in the values of tDAIs, and the values of tDAIs. In PDCCHs are the same which follow the value of the tDAI in the first PDCCH.

Furthermore, any method according to embodiments of the invention may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the client device 100 and the serving device 300 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the client device 100 and the serving device 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

The invention claimed is:

1. A client device for a wireless communication system, comprising:
at least one processor; and
one or more memories coupled to the at least one processor and storing programming instructions for execution by the at least one processor to cause the client device to:
obtain a first downlink assignment index (DAI) in a first downlink control channel associated with transmission of a first transport block, wherein the first DAI indicates a first scheduling assignment for the first transport block;
obtain a second DAI in a second downlink control channel associated with transmission of a second transport block, wherein the second DAI indicates a second scheduling assignment for the second transport block; and
determine the first transport block associated with the first downlink control channel and the second transport block associated with the second downlink control channel are the same transport block based on determining that at least one value of the second DAI is an assigned value identical to a value of the first DAI.

2. The client device according to claim 1, wherein the programming instructions, when executed by the at least one processor, cause the client device to:
receive the first transport block in a first downlink data channel based on the first DAI; and
receive the second transport block in a second downlink data channel based on said second DAI.

3. The client device according to claim 2, wherein the programming instructions, when executed by the at least one processor, cause the client device to:
generate a single hybrid automatic repeat request (HARQ) feedback bit for the first transport block and the second transport block based on the reception of the first transport and the second transport block.

4. The client device according to claim 3, wherein the programming instructions, when executed by the at least one processor, cause the client device to:
generate the single HARQ feedback bit based on combining a first HARQ feedback bit for the first transport block and a second HARQ feedback bit for the second transport block; or
generate the single HARQ feedback bit based on joint decoding of the first transport block and the second transport block.

5. The client device according to claim 1, wherein the programming instructions, when executed by the at least one processor, cause the client device to:
receive the first transport block and the second transport block in a single downlink data channel based on at least one of the first DAI and the second DAI.

6. The client device according to claim 1, wherein each of the first DAI and the second DAI indicates at least one of a counter DAI and a total DAI.

7. The client device according to claim 6, wherein the counter DAI is
a first type counter DAI indicating accumulative number of {transmission and reception point (TRP), serving cell and downlink control channel monitoring occasion}-pairs up to a current TRP and a current serving cell and current physical downlink control channel (PDCCH) monitoring occasion; or
a second type counter DAI indicating accumulative number of {serving cell and downlink control channel monitoring occasion}-pairs up to the current serving cell and current PDCCH monitoring occasion.

8. The client device according to claim 7, wherein the programming instructions, when executed by the at least one processor, cause the client device to:
obtain type information indicating a type of counter DAI based on a higher layer signaling.

9. A serving device for a wireless communication system, comprising: at least one processor; and
one or more memories coupled to the at least one processor and storing programming instructions for execution by the at least one processor to cause the serving device to:
obtain a first DAI for a first downlink control channel associated with transmission of a transport block, wherein the first DAI indicates a first scheduling assignment for the transport block;
obtain at least one second DAI indicating a second scheduling assignment for a second downlink control channel associated with transmission of the transport block, wherein the second DAI indicates a second scheduling assignment for the transport block and wherein at least one value of the second DAI is an assigned value identical to a value of the first DAI to indicate that the first DAI and the second DAI are associated with the same transport block;
transmit the first DAI in the first downlink control channel; and
transmit the second DAI in the second downlink control channel.

10. The serving device according to claim 9, wherein the programming instructions, when executed by the at least one processor, cause the serving device to:
transmit the transport block in a first downlink data channel; and
transmit the transport block in a second downlink data channel.

11. The serving device according to claim 9, wherein the programming instructions, when executed by the at least one processor, cause the serving device to:

receive a single HARQ feedback bit for the transport block in response to the transmission of the transport block.

12. The serving device according to claim 9, wherein the programming instructions, when executed by the at least one processor, cause the serving device to transmit the transport block in a single downlink data channel.

13. The serving device according to claim 9, wherein each of the first DAI and the second DAI indicates at least one of a counter DAI and a total DAI.

14. The serving device according to claim 13, wherein the counter DAI is a first type of counter DAI indicating accumulative number of {transmission and reception point, serving cell and downlink control channel monitoring occasion}-pairs; or a second type of counter DAI indicating accumulative number of {serving cell and downlink control channel monitoring occasion}-pairs.

15. The serving device according to claim 14, wherein the programming instructions, when executed by the at least one processor, cause the serving device to signal type information indicating a type of counter DAI in higher layer signaling.

16. A method for a client device, the method comprising obtaining a first downlink assignment index (DAI) in a first downlink control channel associated with transmission of a first transport block, wherein the first DAI indicates a first scheduling assignment for the first transport block;

obtaining a second DAI in a second downlink control channel associated with transmission of a second transport block, wherein the second DAI indicates a second scheduling assignment for the second transport block; and determining the first transport block associated with the first downlink control channel and the second transport block associated with the second downlink control channel are the same transport block based on determining that at least one value of the second DAI is an assigned value identical to a value of the first DAI.

17. The method according to claim 16, further comprising:

receiving the first transport block in a first downlink data channel based on the first DAI; and receiving the second transport block in a second downlink data channel based on said second DAI.

18. The method according to claim 16, further comprising:

generating a single hybrid automatic repeat request (HARQ) feedback bit for the first transport block and the second transport block based on the reception of the first transport and the second transport block.

* * * * *